(No Model.)
E. WILKINSON.
ADJUSTABLE PICTURE FRAME HANGER.
No. 360,982. Patented Apr. 12, 1887.
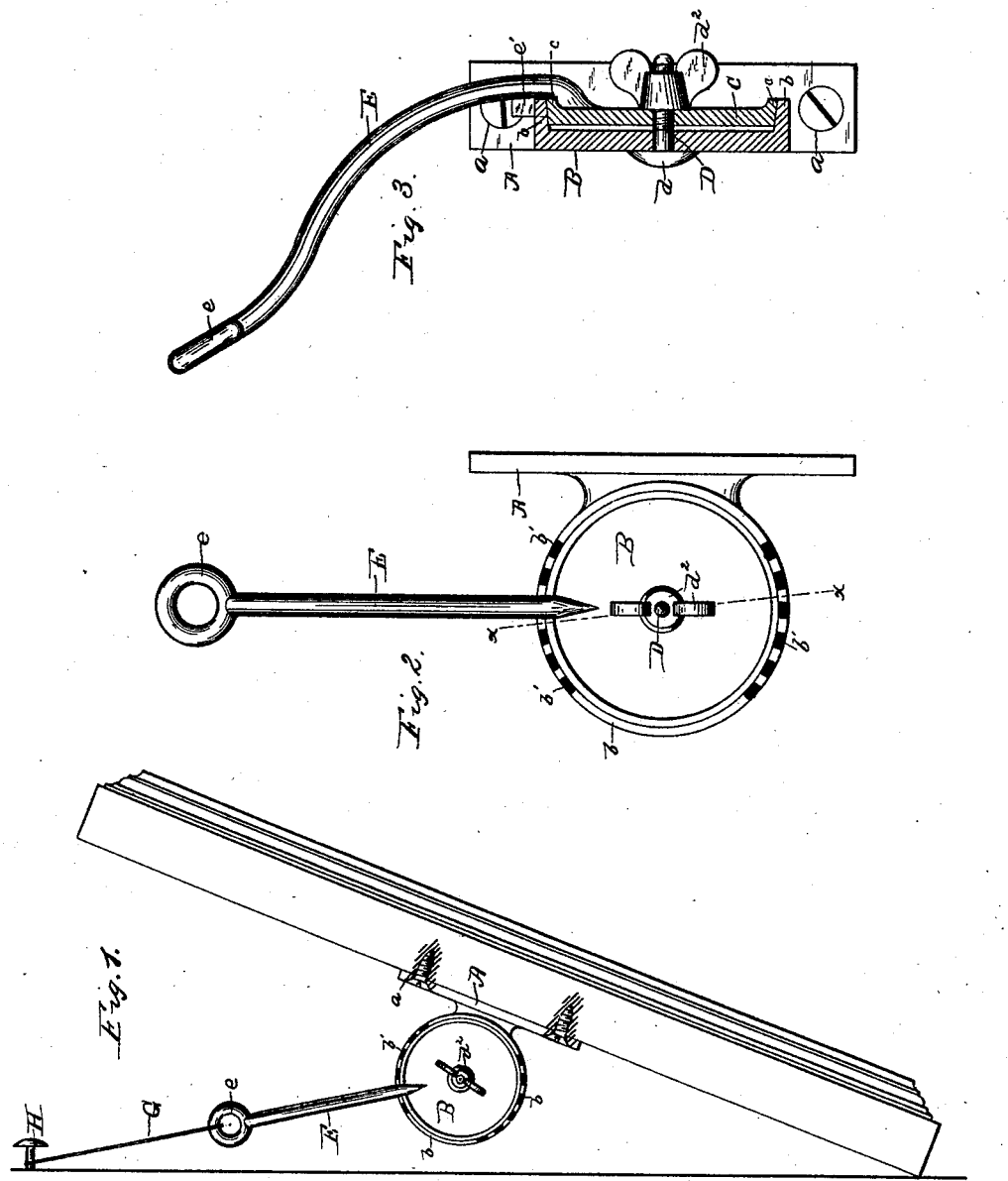
Witnesses
C. E. Doyle
E. G. Siggers
Inventor
Edward Wilkinson
By his Attorneys
C. A. Snow & Co.

UNITED STATES PATENT OFFICE.

EDWARD WILKINSON, OF PATERSON, NEW JERSEY, ASSIGNOR OF ONE-HALF TO EDWIN P. WENTWORTH, OF CAPE ELIZABETH, MAINE.

ADJUSTABLE PICTURE-FRAME HANGER.

SPECIFICATION forming part of Letters Patent No. 360,982, dated April 12, 1887.

Application filed September 11, 1886. Serial No. 213,315. (No model.)

*To all whom it may concern:*

Be it known that I, EDWARD WILKINSON, a citizen of the United States, residing at Paterson, in the county of Passaic and State of New Jersey, have invented a new and useful Improvement in Adjustable Picture-Frame Hangers, of which the following is a specification.

This invention relates to an adjustable picture-frame hanger, having for its object the provision of means whereby a picture, card, or map frame may be adjusted at any desired angle to the wall upon which it is hung without removing it therefrom; and to this end the invention consists in the construction, combination, and arrangement of the several parts, substantially as hereinafter fully set forth, and specifically pointed out in the claims.

In the accompanying drawings, which form a part of this specification, Figure 1 represents in side view a portion of a picture-frame hung on a wall and provided with my improvements. Fig. 2 is an enlarged side elevation of the bracket, and Fig. 3 is a sectional view taken on the line $x\ x$ of Fig. 2.

Referring to the drawings, A designates a bracket or base-plate oblong in elevation, provided with perforations $a\ a$, for the insertion of nails or screws for attaching it to the back of a picture or other frame at or about the center. Formed integral with this plate is an outwardly-projecting disk, B, having an annular flange, $b$, extending outwardly from one side and flared outwardly or beveled on its inner side.

C designates a disk fitting within and abutting against the flange $b$ of the disk B, this disk C being also provided with an annular flange, $c$, which rests against the flange $b$. The outer edge or periphery of the flange $c$ is also beveled or flared, so as to bear with frictional contact against the flange $b$ of the disk B. This frictional contact serves to effectually prevent the sections or disks from slipping one upon the other.

D designates a bolt, pin, or rivet, having its head $d$ on the outside of disk B and its body passing through central aligned perforations in each of the disks B C to the outside of the latter, where it is provided with a thumb-nut, $d^2$. The object of this nut is to bind the disk C against the disk B, so as to prevent the former from moving. The flange of the disk B is provided around its edge with notches or teeth $b'$, the purpose of which will be presently explained.

E designates a curved rod, which is preferably cast integral with the disk C and extends backward in the rear of the disks, the distal end thereof being provided with an eye, $e$, wherein the picture-cord G is secured. A lug, $e'$, is formed on the rod E adjacent to the notches or teeth $b'$ in the disk B, so as to fit in any of said notches.

The operation of my improved picture-frame hanger I will now describe. After the plate A is attached to the picture-frame, the picture is hung upon the wall by connecting the cord G to the eye $e$, and securing the cord to the wall by a nail, such as H. Then, supposing it is desired to change the inclination of the frame from the wall, the thumb-nut $d^2$ is turned, causing the disk C to be loosened, when said disk is turned to cause the engaging-lug $e$ on the rod E to fit any one of the teeth $b'$, and at this point the nut $d^2$ is tightened. In this manner, should it ever become necessary to change the incline of the picture, the operation may be completed without removing the same from the wall or changing the cord, as is the practice now in vogue.

My invention will prove an invaluable aid in focusing with mirrors.

It will be observed that the notches or teeth are placed at the top and bottom of the disk B, the object of this being to provide for reversing either end of the disk, according as it is desired to be made either right or left handed. By turning the disk C half-way around, the rod E is carried around, also and adjusting in the notches at that end of the disk B, causing the bracket to be changed to the other side of the picture-frame.

It is obvious that many changes in the details of construction may be made in my device without departing from the spirit of my invention, and they will readily suggest themselves to the mind of the skillful artisan.

I am aware that a lantern has heretofore been secured to the dash-board of a carriage by an adjustable clamp, said clamp consisting of two disks detachably secured together, one of said disks being secured to the back of the lantern and the other being provided with an arm carrying a lamp. I do not claim such a construction as my invention; neither do I lay claim, broadly, to a picture-frame adjustably supported.

I do not wish to be limited to the use of the lug on the rod E to engage the teeth or notches of one of the clamping-disks, as I am aware that such construction may be omitted without materially affecting the holding properties of the device. The securing and connecting bolt will serve to hold the sections sufficiently tight without any additional means. For this purpose the beveled or flaring flange on one of the disks or sections contributes in no small degree to prevent the sections or disks from slipping.

What I claim is—

1. In a picture support or hanger, the combination, with a bracket or base-plate, A, of disks B C, connected by a bolt and nut, pin, or rivet, and provided with flanges, the flange on disk B being provided with teeth or notches, and a cord-attaching rod secured to disk C, provided with a lug to engage the teeth or notches, substantially as and for the purpose set forth.

2. A picture-frame hanger comprising two disks detachably secured together, one of said disks being secured to the picture-frame, a cord-attaching rod carried by the other disk and engaging the disk on the frame, and mechanism for holding said rod to the wall, substantially as set forth.

3. A picture-frame hanger comprising two disks or sections clamped together, so as to be adjustable one upon the other, one of said disks being connected to the picture-frame, and an attaching-rod, E, secured to the other disk, and suspending means secured to said rod, as set forth.

4. In combination with the clamping-disks B C, connected together by a bolt and nut, pin, or rivet, said disks being attached to the frame of a picture or the like, the cord-attaching rod E, fitted to one of the disks and adjustable on the others, as set forth.

5. In a picture support or hanger, the combination, with the base-plate, of the clamping-disks B C, the disk B having a flange, against which the edge of the disk C abuts, the cord-connecting rod extending from the disk C, and means for holding the disks together, substantially as described.

6. In a picture support or hanger, the combination, with the base-plate, of the clamping-disks B C, having a common center, the disk B having a flange around its edge, against which the edge of the disk C abuts, the cord-connecting rod extending from the disk C, and a clamping-bolt passed through the common centers of the clamping-disks and provided with a thumb-nut on its screw-threaded end, substantially as set forth.

7. The combination, in a picture support or hanger, with the base-plate, of the clamping-disks B C, having flanges, the flange on the disk B being notched along its edge, and the cord-connecting rod extending from the disk C, and having a lug which engages the notches of the disk B, and provided at its distant end with an eye, to which the cord is secured, substantially as specified.

8. In a picture or other hanger, the bracket or base-plate A, adapted to be attached to the object to be hung, the disk or section B, secured to the base-plate and having the flaring flange $b$, and the adjustable disk or section C, having a flange, $c$, to fit within and bear with frictional contact against the flange $b$ of the disk or section B, and the bolt and nut, pin, or rivet connecting the sections B C, as set forth.

In testimony that I claim the foregoing as my own I have hereto affixed my signature in presence of two witnesses.

EDWARD WILKINSON.

Witnesses:
THOMAS FARLEY,
THOMAS P. KERWIN.